United States Patent
Koch

(10) Patent No.: US 10,240,527 B2
(45) Date of Patent: Mar. 26, 2019

(54) EXHAUST-GAS TURBOCHARGER

(71) Applicant: BorgWarner Inc., Auburn Hills, MI (US)

(72) Inventor: Silvio Koch, Kirchheimbolanden (DE)

(73) Assignee: BorgWarner Inc., Auburn Hills, MI (US)

( * ) Notice: Subject to any disclaimer, the term of this patent is extended or adjusted under 35 U.S.C. 154(b) by 244 days.

(21) Appl. No.: 14/408,093

(22) PCT Filed: Jun. 20, 2013

(86) PCT No.: PCT/US2013/046741
§ 371 (c)(1),
(2) Date: Dec. 15, 2014

(87) PCT Pub. No.: WO2014/004240
PCT Pub. Date: Jan. 3, 2014

(65) Prior Publication Data
US 2015/0192066 A1  Jul. 9, 2015

(30) Foreign Application Priority Data

Jun. 25, 2012 (DE) .......... 10 2012 012 557

(51) Int. Cl.
*F01D 25/16* (2006.01)
*F02C 6/12* (2006.01)
(Continued)

(52) U.S. Cl.
CPC ............. *F02C 6/12* (2013.01); *F01D 25/16* (2013.01); *F01D 25/24* (2013.01); *F16C 33/586* (2013.01);
(Continued)

(58) Field of Classification Search
CPC ........ F01D 25/16; F01D 25/162; F01D 25/24; F01D 25/243; F01D 11/00; F01D 11/003; F04D 29/0462; F04D 29/0563; F04D 29/122; F05B 2220/40; F05B 2230/604; F05B 2240/50; F05B 2240/54; F05B 2240/57; F05D 2240/50; F05D 2240/54; F05D 2240/55; F05D 2240/58;
(Continued)

(56) References Cited

U.S. PATENT DOCUMENTS 4,240,678 A * 12/1980 Sarle ............... F01D 25/166
384/369
5,409,350 A * 4/1995 Mitchell ........... F04D 29/0462
277/371

(Continued)

*Primary Examiner* — Bryan Lettman
*Assistant Examiner* — Charles W Nichols
(74) *Attorney, Agent, or Firm* — Eric L. Doyle; Stephan A. Pendorf; Patent Central LLC

(57) ABSTRACT

An exhaust-gas turbocharger (1) with a bearing housing (2), a bearing cartridge (8) inserted into the bearing housing (2), a shaft (7) which is mounted in the bearing cartridge (8) and which extends in an axial direction, a bearing housing cover (9) which is connected to the bearing housing (2), a turbine wheel (5) which is arranged on the shaft (7), and a compressor wheel (6) which is arranged on the shaft (7), wherein the bearing housing cover (9) is connected directly to the bearing cartridge (8) in order to secure the bearing cartridge (8) in the axial direction and against rotation.

10 Claims, 8 Drawing Sheets

(51) Int. Cl.
 *F01D 25/24* (2006.01)
 *F16C 33/58* (2006.01)
 *F16C 19/18* (2006.01)

(52) U.S. Cl.
 CPC ...... *F05D 2220/40* (2013.01); *F05D 2230/64* (2013.01); *F16C 19/184* (2013.01); *F16C 2226/50* (2013.01); *F16C 2360/24* (2013.01); *Y10T 29/49245* (2015.01)

(58) Field of Classification Search
 CPC ......... F05D 2240/581; Y10T 29/49245; F02C 6/12; F16C 2360/24; F16C 2226/50; F16C 35/06; F16C 35/067
 See application file for complete search history.

(56) References Cited

U.S. PATENT DOCUMENTS

2009/0071003 A1* 3/2009 Mavrosakis ............ F01D 25/16
 29/888.024
2011/0052388 A1* 3/2011 Mavrosakis .......... F01D 25/162
 415/229

\* cited by examiner

EXHAUST-GAS TURBOCHARGER

BACKGROUND OF THE INVENTION

Field of the Invention

The invention relates to an exhaust-gas turbocharger and to a method for the assembly of an exhaust-gas turbocharger.

Description of the Related Art

Exhaust-gas turbochargers according to the prior art comprise a bearing housing. A shaft is rotatably mounted in the bearing housing. A turbine wheel is mounted on one end of the shaft. A compressor wheel is mounted on the other end of the shaft. The mounting of the shaft in the bearing housing may be realized by means of a bearing cartridge. Rolling bearings and/or plain bearings for mounting the shaft are arranged in such a bearing cartridge. The bearing cartridge must be secured within the bearing housing both against an axial displacement and also against rotation. Separate fixing elements are normally used for securing the bearing cartridge.

It is an object of the present invention to specify an exhaust-gas turbocharger which, while being inexpensive to produce and assemble, can be operated reliably and with little maintenance. It is also an object of the present invention to specify a corresponding method for assembling the exhaust-gas turbocharger.

BRIEF SUMMARY OF THE INVENTION

The object is achieved by the features of the independent claims. The dependent claims relate to advantageous refinements of the invention.

According to the invention, the outer race of the bearing cartridge is secured both in the axial direction and also against rotation directly by means of the bearing housing cover. The "axial direction" is defined by the shaft. The "rotation" is a movement around the axial direction. According to the invention, the outer race of the bearing cartridge is secured in both axial directions and in both directions of rotation by means of the bearing housing cover. This is achieved in that the bearing housing cover is placed in direct connection with the bearing cartridge. Furthermore, the bearing housing cover is fixedly connected to the bearing housing, such that the outer race of the bearing cartridge is fixedly positioned relative to the bearing housing by means of the bearing housing cover.

According to the invention, the bearing housing cover directly absorbs the operating forces of the turbocharger. In this way, it is possible for a further component, which in previously known arrangements was used only for fixing the bearing cartridge, to be dispensed with. A reduction in tolerances is possible by fine machining of the contact surfaces with respect to the cartridge.

The axial securing action and the securing action against rotation are preferably realized by means of two positive fits between the bearing housing cover and the outer race of the bearing cartridge. For the securing action in the axial direction, it is preferably provided that the outer race of the bearing cartridge has a groove on the outer circumference. A radially inwardly directed lug of the bearing housing cover engages into said groove.

For the securing action against rotation, a pin is inserted, in particular in a radial direction, through the bearing housing cover and through the outer race of the bearing cartridge. The pin is fixedly seated in the bearing housing cover. The pin has a small degree of play with respect to the outer race of the bearing cartridge, such that the outer race of the bearing cartridge can float on its damping film.

The invention also encompasses a method for the assembly of an exhaust-gas turbocharger. The advantageous refinements described within the context of the exhaust-gas turbocharger according to the invention, and the subclaims, are correspondingly preferably used with the method according to the invention. It is provided in the method according to the invention that, firstly, the bearing housing cover is pushed onto the bearing cartridge. Here, the lug of the bearing housing cover engages into the groove of the outer race of the bearing cartridge. It is particularly preferable for a flattening to be provided on the groove. It is at precisely this flattening that the lug is pushed into the groove. The bearing housing cover is thereupon rotated relative to the bearing cartridge, such that the lug is no longer situated at the flattening. The two components are rotated relative to one another until two corresponding bores are aligned with one another. The pin is inserted into the bearing housing cover and into the outer race of the bearing cartridge through said two bores.

The bearing housing cover and the bearing cartridge may be preassembled with one another and thus form an "assembled unit".

BRIEF DESCRIPTION OF THE SEVERAL VIEWS OF THE DRAWINGS

Further details, advantages and features of the present invention become apparent from the following description of exemplary embodiments with reference to the drawing. In the drawing.

DETAILED DESCRIPTION OF THE INVENTION

Figure 1:
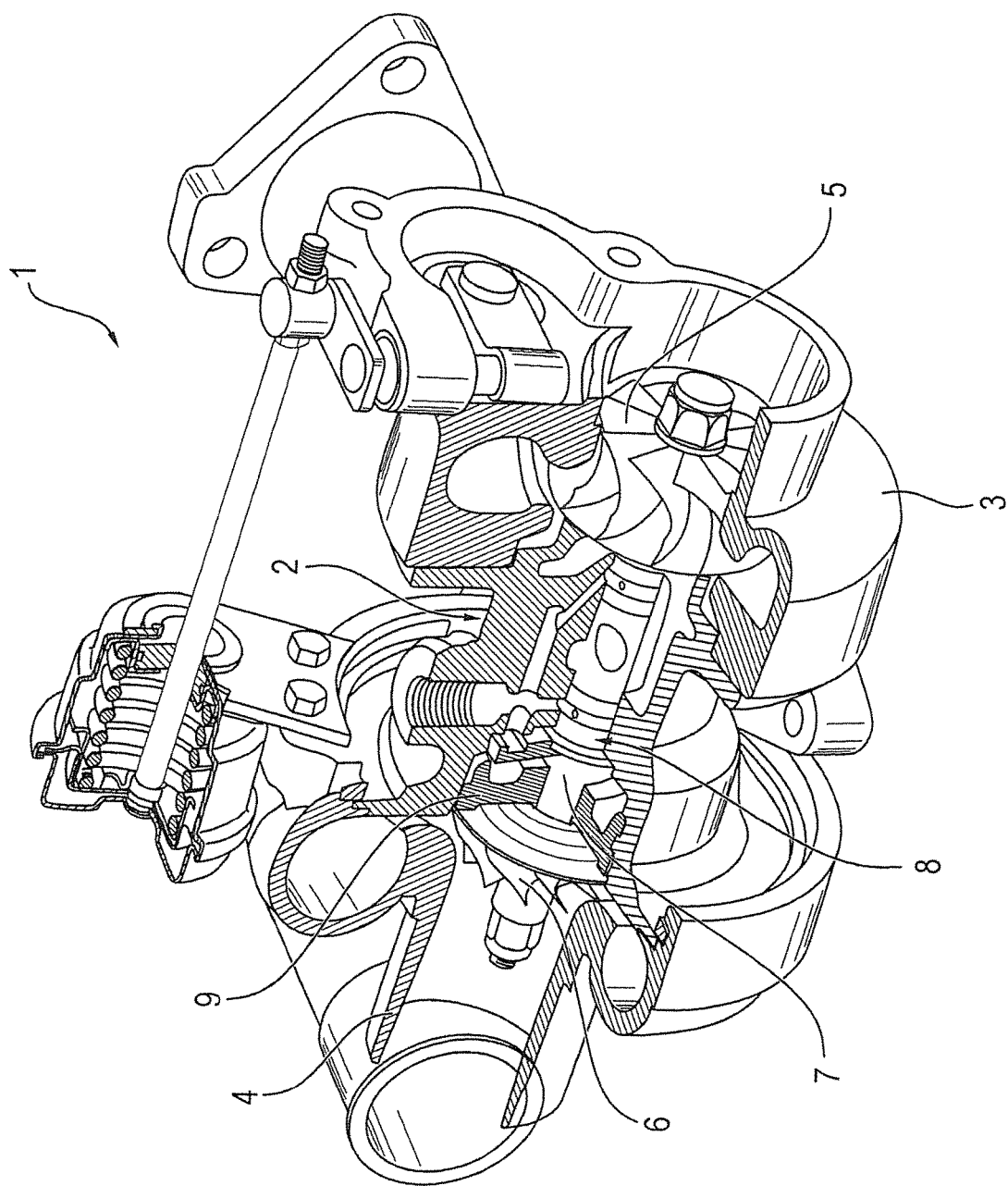
FIG. 1 shows an exhaust-gas turbocharger according to the invention as per an exemplary embodiment.

FIG. 1 shows, in a partially sectional view, a schematically simplified illustration of the exhaust-gas turbocharger 1 according to the exemplary embodiment.

The exhaust-gas turbocharger 1 comprises a bearing housing 2, a turbine housing 3 and a compressor housing 4. A turbine wheel 5 is arranged in the turbine housing 3. A compressor wheel 6 is situated in the compressor housing 4. A shaft 7 is rotatably mounted in the bearing housing 2. The mounting of the shaft 7 is realized by means of a bearing cartridge comprising outer race 8, inner race or races 20, and balls or roller elements 11. In the example shown, the bearing housing 2 is closed off at the compressor side by means of a bearing housing cover 9. Likewise, the bearing housing 2 may alternatively or additionally also be closed off at the turbine side by means of a bearing housing cover 9. The shaft 7 runs through the bearing housing cover 9.

During operation of the exhaust-gas turbocharger 1, exhaust gas flows to the turbine wheel 5 via the turbine housing 3. In this way, the turbine wheel 5, the shaft 7 and the compressor wheel 6 are set in rotation. Charge air for an internal combustion engine is compressed by means of the compressor wheel 6. Oil is supplied to the bearing cartridge via the bearing housing 2. Accordingly, the shaft 7 must be sealed off with respect to the bearing housing cover 9. Furthermore, the bearing housing cover 9 is also sealingly connected to the bearing housing 2 in order to prevent an escape of oil.

Figure 2:
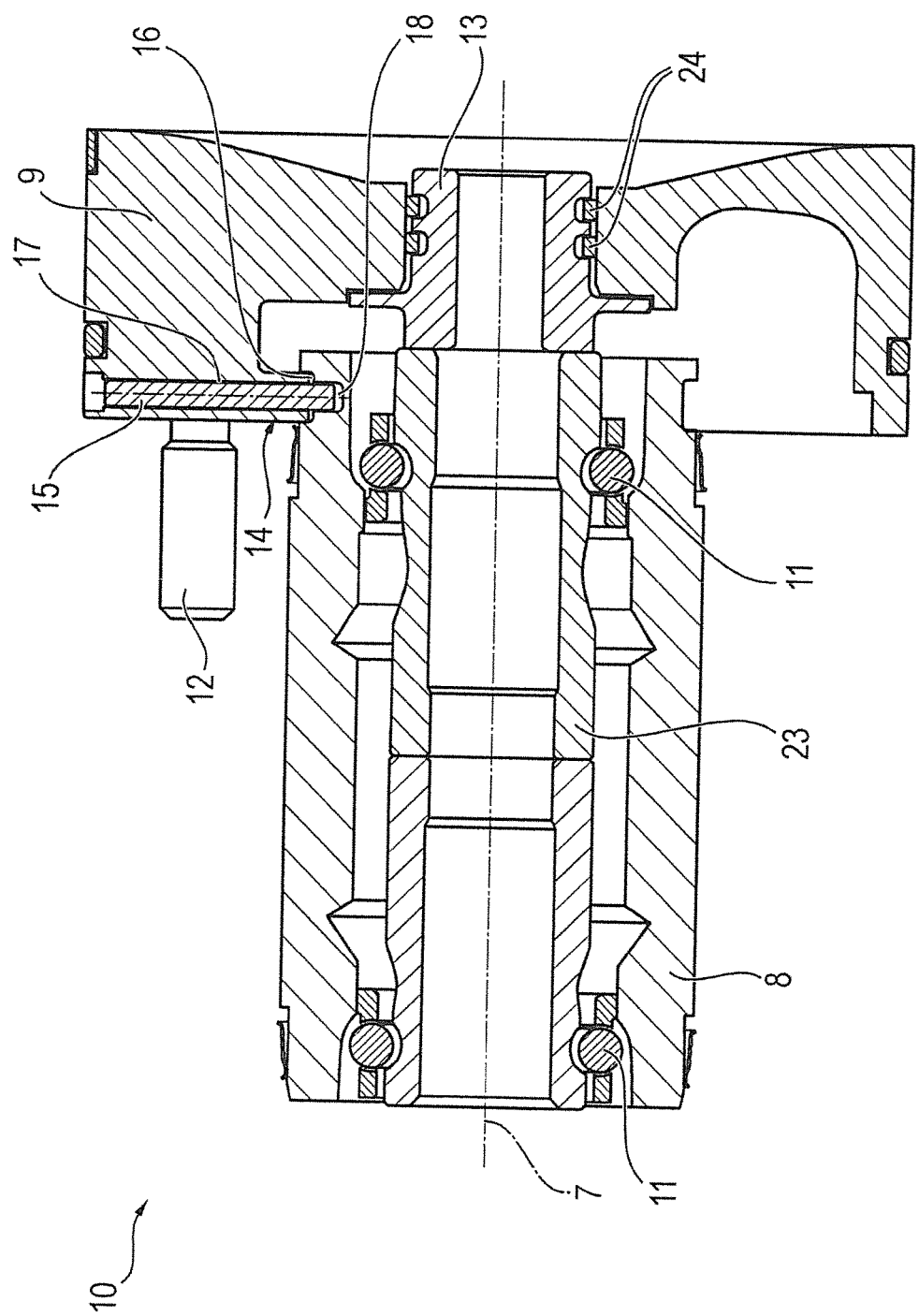
FIG. 2 shows an assembled unit of the exhaust-gas turbocharger according to the invention as per the exemplary embodiment.

FIG. 2 shows a plurality of components of the exhaust-gas turbocharger 1 as an assembled unit 10. Said assembled unit 10 comprises the bearing cartridge, the bearing housing cover 9 mounted on the bearing cartridge, and a seal bush 13 inserted into the bearing housing cover 9. To simplify the illustration, the shaft 7 is illustrated merely as an axis.

FIG. 2 shows two rolling bearings 11 of the bearing cartridge for the shaft 7. The bearing housing cover 9 is screwed directly to the bearing housing 2 by means of a screw connection 12 in the form of a threaded bolt.

Figure 3:
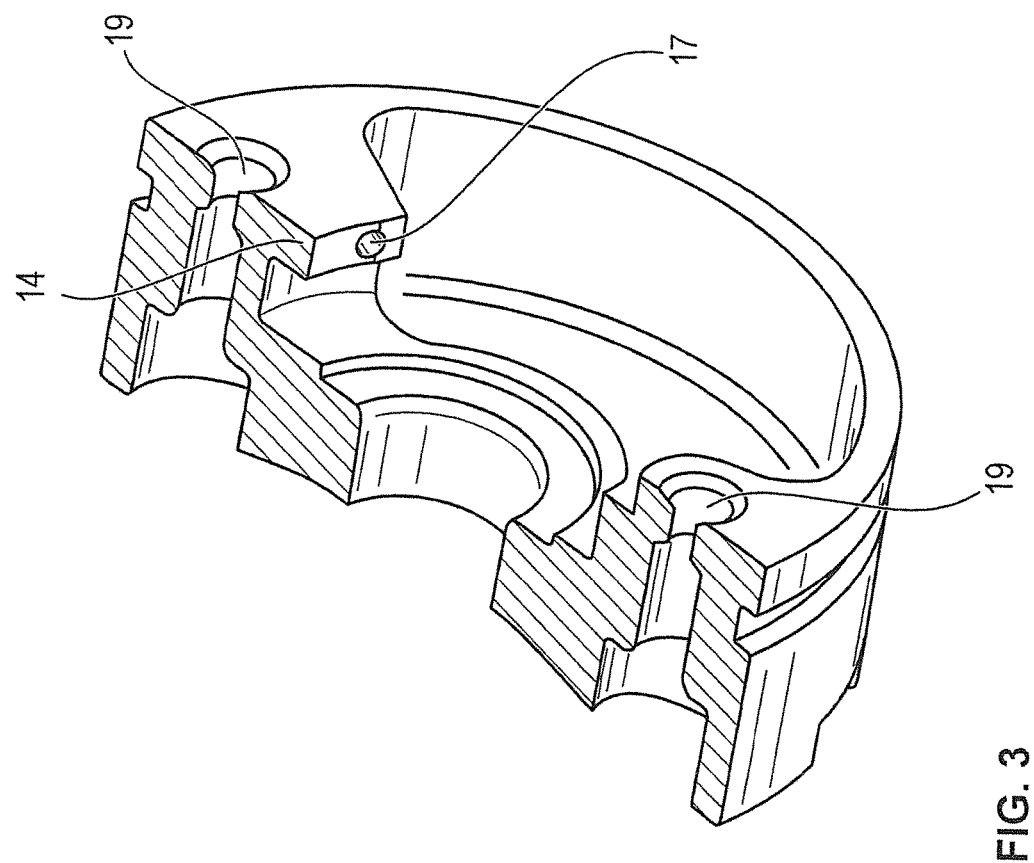
FIG. 3 shows a bearing housing cover of the exhaust-gas turbocharger according to the invention as per the exemplary embodiment.
Figure 3:
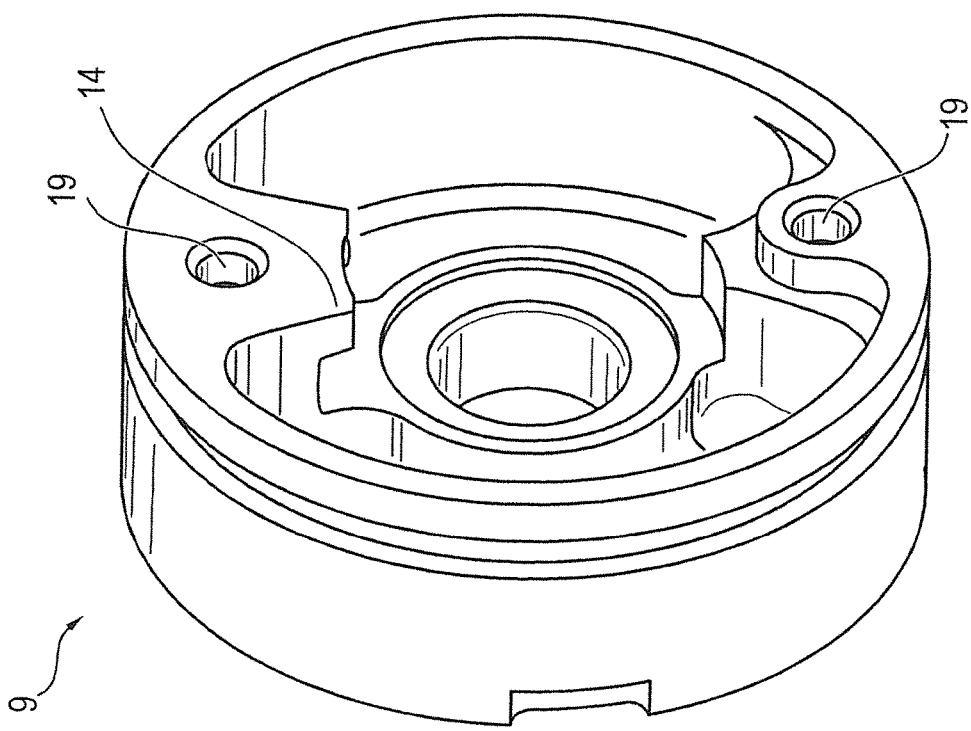
Figure 4:
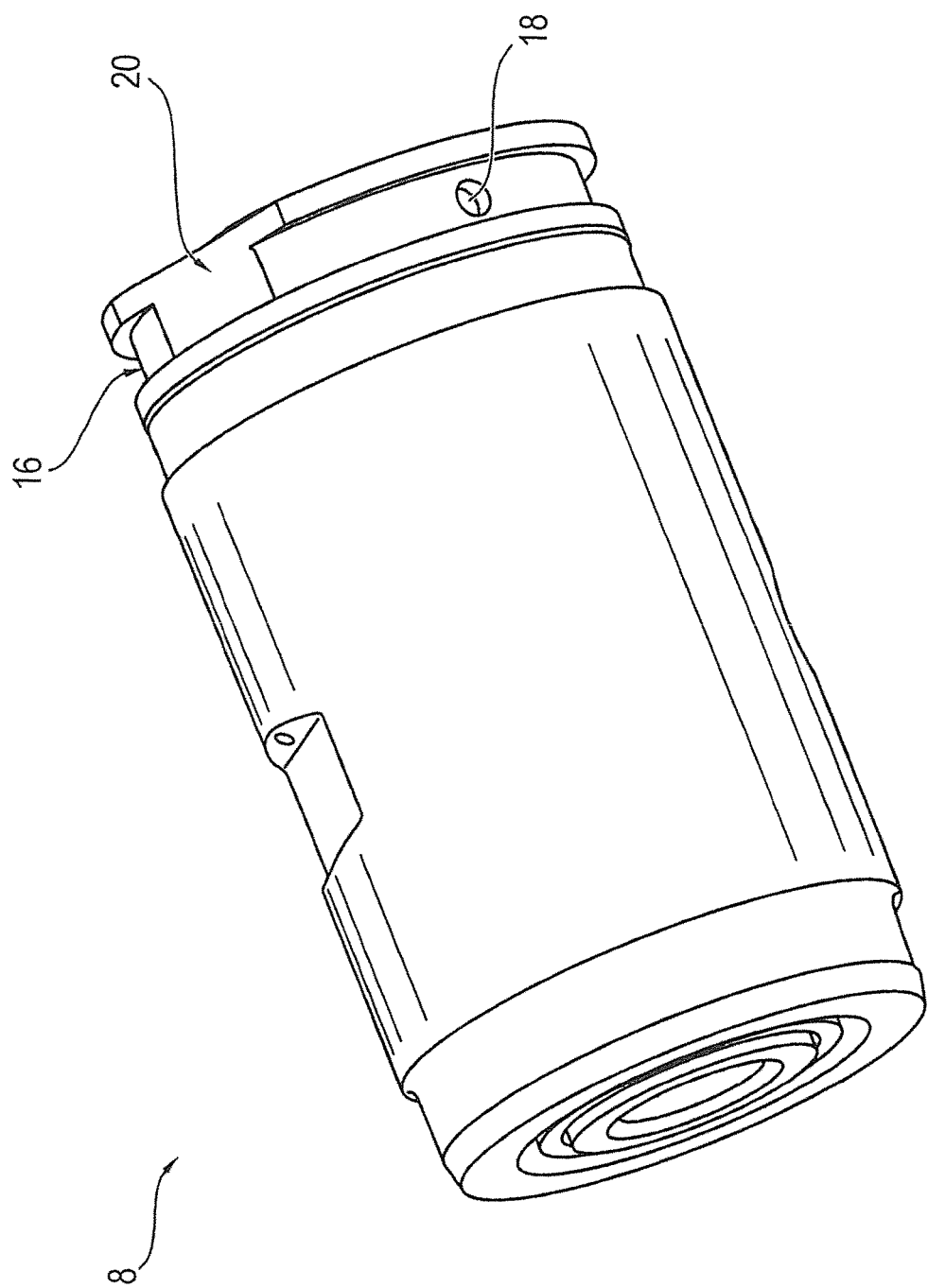
FIG. 4 shows a bearing cartridge of the exhaust-gas turbocharger according to the invention as per the exemplary embodiment.

FIG. 2 shows the fully assembled state of the assembled unit 10. FIG. 3 shows the bearing housing cover 9 in a complete view and in a cut-away view. FIG. 4 shows the bearing cartridge in detail. From said figures, it can be seen that the bearing housing cover 9 has a lug 14. Said lug 14 extends radially inward. An encircling groove 16 is formed on the outer circumference of the bearing cartridge outer race 8. The groove 16 has a flattening 20 at one location. In the assembled state of the assembly unit 10, the lug 14 is in positive engagement with the groove 16. In this way, an axial displacement of the bearing cartridge outer race 8 is no longer possible in either direction.

Furthermore, a first bore 17 is formed in the bearing housing cover 9. In the assembled state, said first bore 17 is aligned with a second bore 18 in the bearing cartridge outer race 8. In the example shown, the first bore 17 is situated in the lug 14. Correspondingly, the second bore 18 is situated in the groove 16. A pin 15 is inserted through the first bore 17 and through the second bore 18. The pin 15 prevents a rotation of the bearing cartridge outer race 8 relative to the bearing housing cover 9.

The process of assembling the assembled unit 10 will be explained on the basis of FIGS. 5 and 6. As per FIG. 5, the lug 14 is firstly positioned at the flattening 20. The bearing cartridge outer race 8 and the bearing housing cover 9 are thereupon pushed one inside the other. In a subsequent step, the bearing housing cover 9 is rotated relative to the bearing cartridge outer race 8, such that, as illustrated in FIG. 6, the lug 14 is no longer situated at the flattening 20. Said bearing housing cover is rotated until the first bore 17 is aligned with the second bore 18. The pin 15 is thereupon inserted. Said complete assembled unit 10 is connected to the bearing housing 2. Here, the screw connection 12 is formed through bolt holes 19.

According to the invention, the bearing housing cover 9 is placed in direct positive connection with the bearing cartridge 8. Here, the bearing cartridge outer race 8 is secured both against an axial displacement and also against rotation. According to the invention, no further components are required for securing the bearing cartridge outer race 8, such that both assembly and production are simplified.

Figure 7:
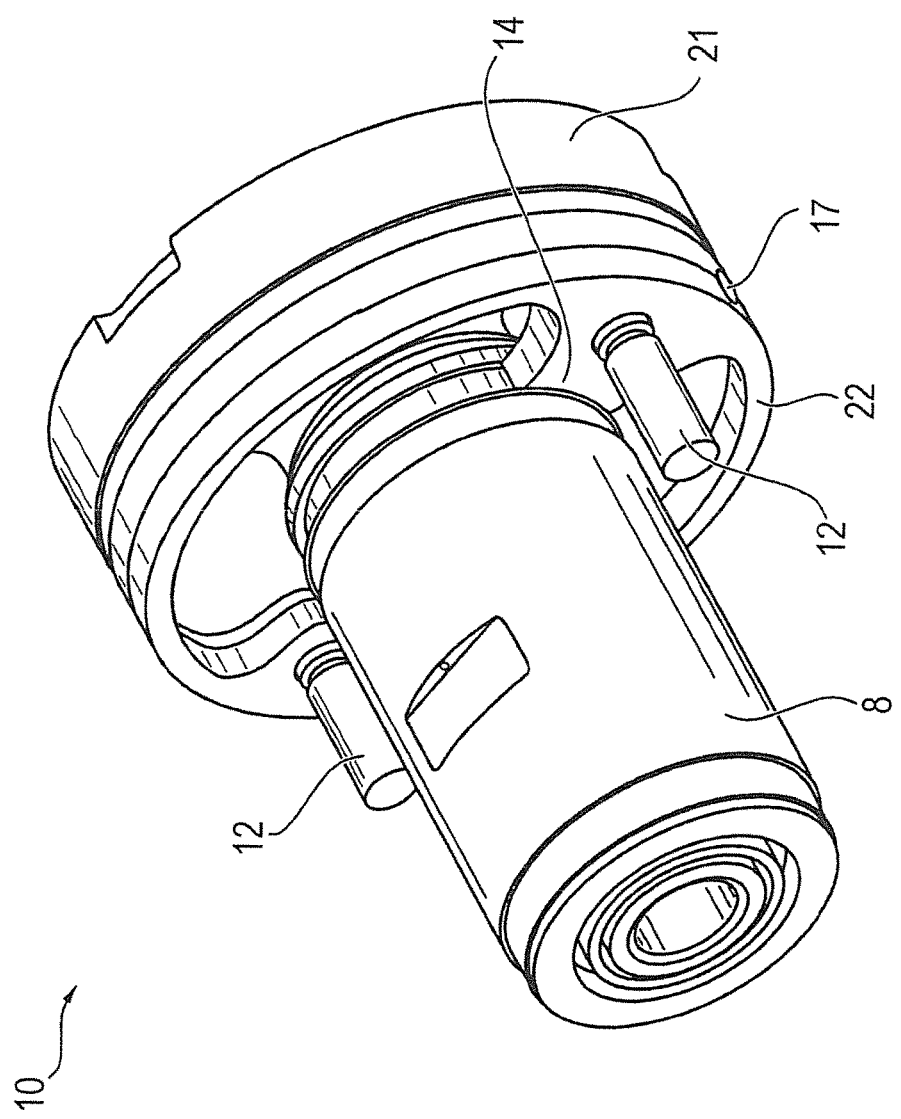
FIG. 7 shows a bearing cartridge with two-part bearing housing cover of an exhaust-gas turbocharger according to the invention as per a further exemplary embodiment.
Figure 8:
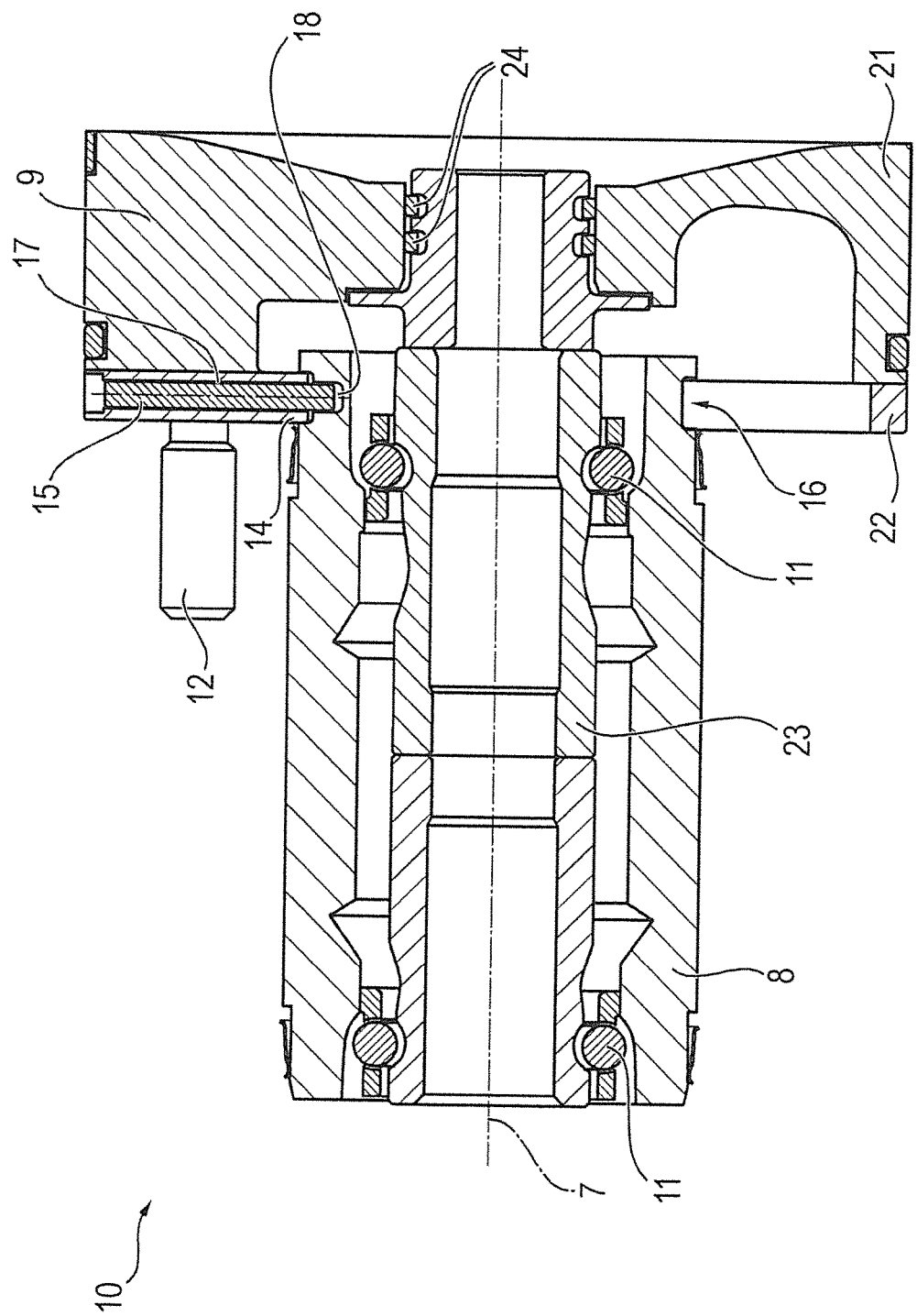
FIG. 8 shows a sectional illustration of FIG. 7.

FIGS. 7 and 8 show in each case the fixing of the bearing cartridge outer race 8 by means of a two-part bearing housing cover 9. Here, the bearing housing cover 9 comprises a symmetrical first part 21 and an asymmetrical second part 22. The two parts 21 and 22 are connected to the bearing housing 2 by means of the screw connection 12.

Figure 5:
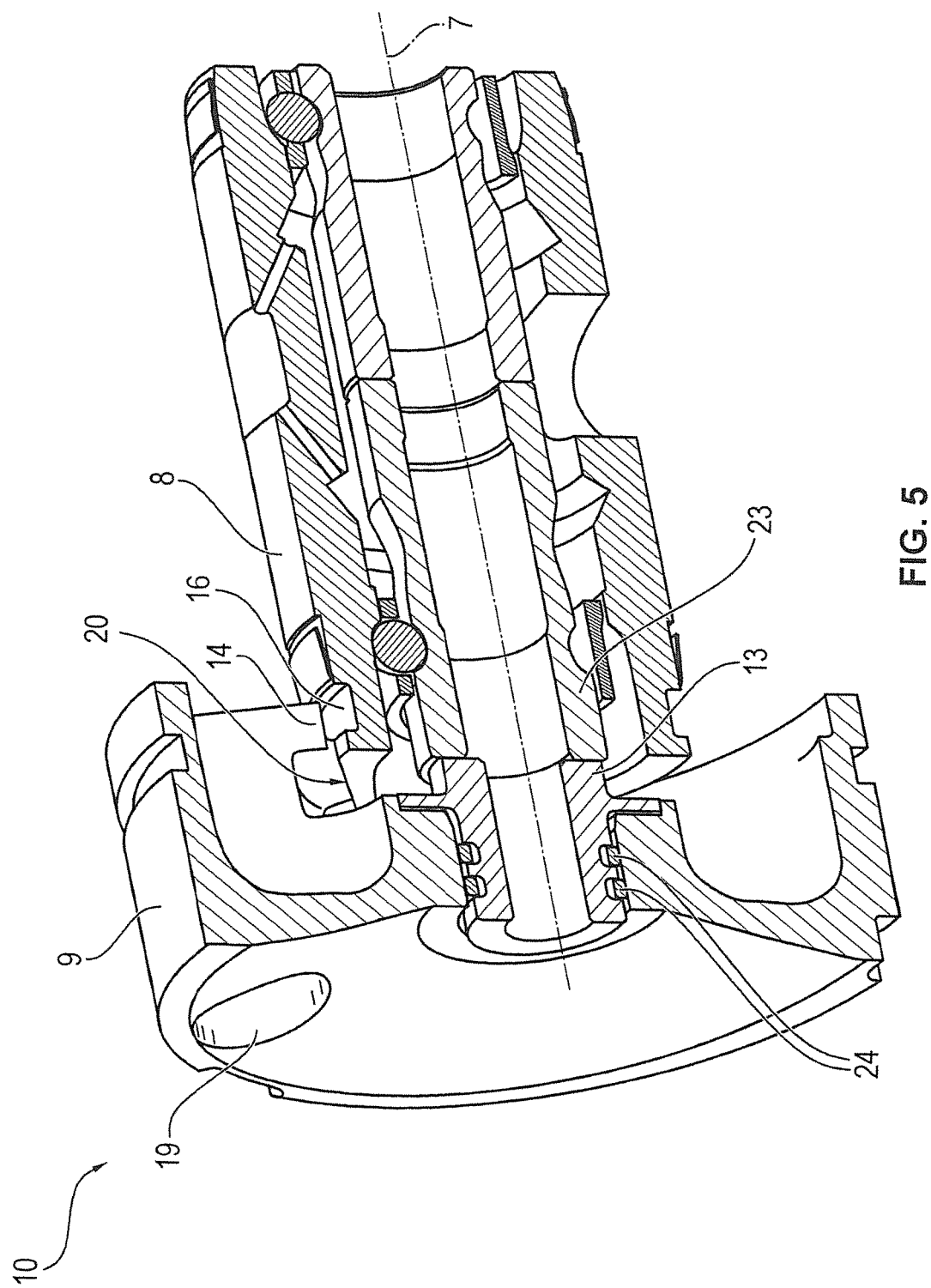
FIG. 5 shows a first assembly step for the exhaust-gas turbocharger according to the invention as per the exemplary embodiment.
Figure 6:
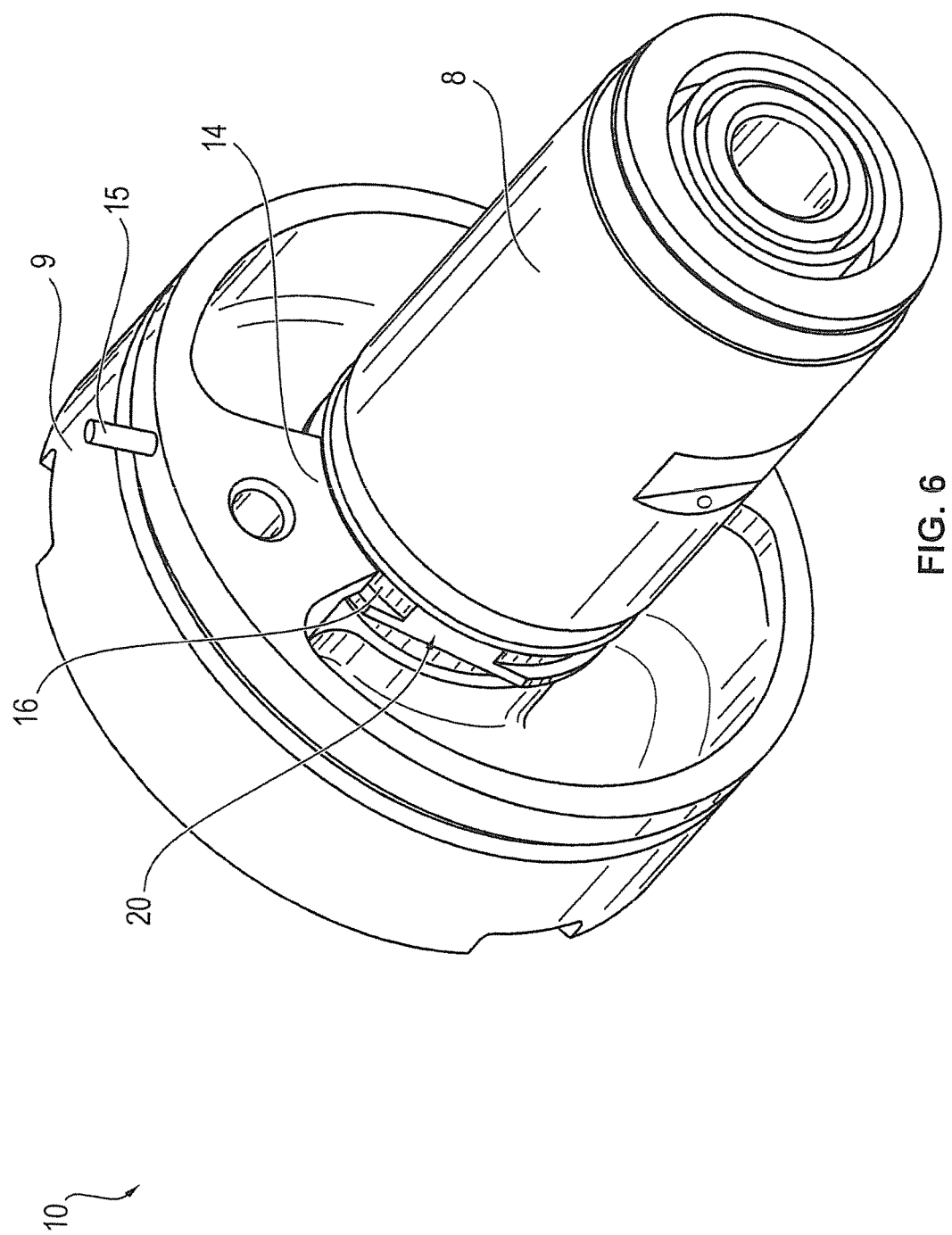
FIG. 6 shows a second assembly step for the exhaust-gas turbocharger according to the invention as per the exemplary embodiment.

FIGS. 2, 5 and 8 show piston rings 24 (also: seal rings). Alternatively to the illustration, an inner ring 23 of the bearing cartridge outer race 8 may be of elongated design, such that the piston rings 24 can be arranged directly on the inner ring 23.

In addition to the above written description of the invention, reference is hereby explicitly made to the diagrammatic illustration of the invention in FIGS. 1 to 8 for additional disclosure thereof.

LIST OF REFERENCE SIGNS

1 Exhaust-gas turbocharger
2 Bearing housing
3 Turbine housing
4 Compressor housing
5 Turbine wheel
6 Compressor wheel
7 Shaft
8 Bearing cartridge outer race
9 Bearing housing cover
10 Assembled unit
11 Rolling bearing
12 Screw connection
13 Seal bush
14 Lug
15 Pin
16 Groove
17 First bore
18 Second bore
19 Bolt holes
20 Flattening
21 First bearing housing cover part
22 Second bearing housing cover part
23 Inner ring
24 Piston rings

The invention claimed is:
1. An exhaust-gas turbocharger (1) comprising:
a bearing housing (2),
a bearing cartridge inserted into the bearing housing (2), the bearing cartridge comprising at least one outer race (8), at least one inner race (23), and balls or roller elements (11), wherein a groove (16) surrounds the bearing cartridge outer race (8) and wherein the outer circumference of the outer race adjacent the groove (16) is flattened at at least one location,
a shaft (7) which is mounted in the bearing cartridge and which extends in an axial direction,
a bearing housing cover (9) which is connected to the bearing housing (2), the bearing housing cover (9) including at least one radially inwardly directed lug (14),
a turbine wheel (5) which is arranged on the shaft (7), and
a compressor wheel (6) which is arranged on the shaft (7),
wherein
to provide an axial securing action, at least one radially inwardly directed lug (14) of the bearing housing cover (9) projects into the groove (16) of the bearing cartridge outer race (8), and to secure the bearing cartridge outer race (8) against rotation, the bearing housing cover (9) is connected directly to the bearing cartridge outer race (8) via at least one continuous radial pin inserted into the bearing housing cover (9) and into the bearing cartridge outer race (8).

2. The exhaust-gas turbocharger as claimed in claim 1, wherein the bearing housing cover (9) is manufactured in one piece together with the lug (14).

3. The exhaust-gas turbocharger as claimed in claim 1, wherein the bearing housing cover (9) is formed in multiple parts.

4. The exhaust-gas turbocharger as claimed in claim 1, wherein the fit of the pin (15) in a first bore (17) in the bearing housing cover (9) is in the form of a transition or interference fit, and wherein the fit of the pin (15) in a second bore (18) in the bearing cartridge outer race (8) is in the form of a clearance fit.

5. The exhaust-gas turbocharger as claimed in claim 1, wherein a seal bush (13) is inserted in the bearing housing cover (9), wherein the shaft (7) runs through the seal bush (13).

6. The exhaust-gas turbocharger as claimed in claim 1, wherein the bearing housing cover (9) is connected to the bearing housing (2) by means of a bayonet connection or a screw connection (12).

7. A method for the assembly of an exhaust-gas turbocharger (1), comprising the following steps:
   providing a bearing cartridge including at least one bearing cartridge outer race (8), at least one bearing cartridge inner race (23), and balls or rolling elements (11), the bearing cartridge outer race having a groove that surrounds the outer circumference and the outer circumference being flattened at at least one location adjacent the groove (16),
   mounting a bearing housing cover (9) with at least one radially inwardly directed lug (14) onto the bearing cartridge outer race (8),
   rotating the bearing housing cover (9) relative to the bearing cartridge outer race (8) such that the radially inwardly directed lug (14) engages into the groove (16) to axially secure the bearing cartridge outer race (8),
   inserting a pin (15) radially into the bearing housing cover (9) and into the bearing cartridge outer race (8), and
   inserting the pre-assembled bearing housing cover (9) and bearing cartridge into the bearing housing of the turbocharger (1) to secure the bearing cartridge outer race (8) against rotation relative to the bearing housing cover (9).

8. The exhaust-gas turbocharger as claimed in claim 1, wherein the bearing housing cover (9) is manufactured in one piece as a cast part together with the lug (14).

9. An exhaust-gas turbocharger (1) comprising:
   a bearing housing (2),
   a bearing cartridge inserted into the bearing housing (2), the bearing cartridge comprising at least one outer race (8), at least one inner race (23), and balls or roller elements (11), wherein a groove (16) surrounds the bearing cartridge outer race (8) and wherein the outer circumference of the outer race adjacent the groove (16) is flattened at at least one location,
   a shaft (7) which is mounted in the bearing cartridge and which extends in an axial direction,
   a bearing housing cover (9) which is connected to the bearing housing (2), the bearing housing cover (9) including at least one radially inwardly directed lug (14),
   a turbine wheel (5) which is arranged on the shaft (7), and
   a compressor wheel (6) which is arranged on the shaft (7), wherein
      to provide an axial securing action, at least one radially inwardly directed lug (14) of the bearing housing cover (9) projects into the groove (16) of the bearing cartridge outer race (8), and
      to secure the bearing cartridge outer race (8) against rotation, the bearing housing cover (9) is connected directly to the bearing cartridge outer race (8) via at least one continuous radial pin inserted into the bearing housing cover (9) and into the bearing cartridge outer race (8), wherein the radial pin (15) extends through a first bore (17) in the inwardly directed lug (14) of the bearing housing cover (9) and into a second bore (18) in the groove (16) of the bearing cartridge outer race (8).

10. The exhaust-gas turbocharger as claimed in claim 1, wherein the radial pin (15) is fixedly seated in first bore (17) in the bearing housing cover (9) and with play in a second bore (18) in the groove (16) of the bearing cartridge outer race (8) sufficient to allow the bearing cartridge to float on a damping film.

* * * * *